April 5, 1949.                A. J. WEATHERHEAD, JR                2,466,521
                                   TUBE NUT
                               Filed July 4, 1945
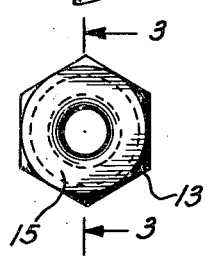
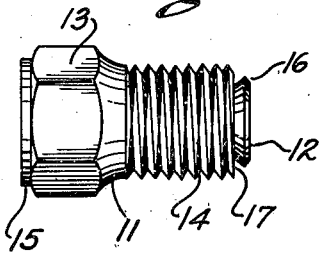
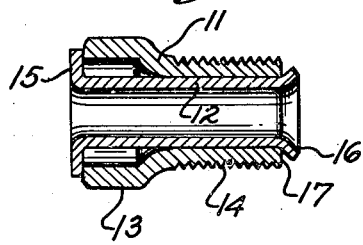
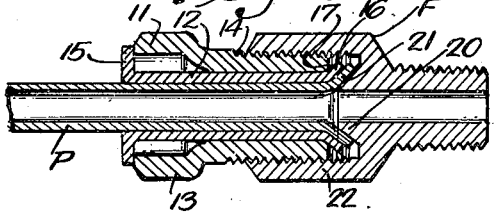
INVENTOR.
ALBERT J. WEATHERHEAD, JR.
BY Richey & Watts
ATTORNEYS Patented Apr. 5, 1949

2,466,521

UNITED STATES PATENT OFFICE 2,466,521

TUBE NUT

Albert J. Weatherhead, Jr., Shaker Heights, Ohio, assignor to The Weatherhead Company, Cleveland, Ohio, a corporation of Ohio Application July 4, 1945, Serial No. 603,137

1 Claim. (Cl. 285—167)

My invention relates to tube nuts and concerns particularly a nut for securing flared tube couplings.

It is an object of my invention to provide an improved method of manufacturing nuts for tube couplings, and to provide an improved, inexpensive, readily fabricated tube nut.

A further object is to provide a hollow nut which has advantages of a nut composed of hard tough metal without the difficulty of forming threads in such material.

Other and further objects, features and advantages will become apparent as the description proceeds.

In carrying out my invention in its preferred form, I provide an outer shell which is threaded and one end of which has been expanded to form a suitable nut head such as a hexagonal head and within the shell I provide an inner sleeve which is flanged at one end to abut the expanded head and flared at the other end to retain it within the shell. The shell may be composed of a readily worked, easily threaded, material such as brass, for example, and the sleeve is composed of a tougher material such as stainless steel which will not deform when driven against a cutting sleeve for use in the tube coupling.

A better understanding of the invention will be afforded by the following detailed description considered in conjunction with the accompanying drawing in which—

Fig. 1 is a plan view of an embodiment of the invention;

Fig. 2 is an end view seen from the end of the nut at which the head is formed;

Fig. 3 is a medial longitudinal sectional view corresponding to Fig. 1; and,

Fig. 4 shows the tube nut assembled with a flared metallic tubing.

Like reference characters are utilized throughout the drawing to designate like parts.

For the sake of illustration, a tube nut formed in accordance with one embodiment of my invention is illustrated in the drawings. Such a nut may be employed for various purposes, especially for securing tubing in a tube coupling, such as those of the type employing a cutting sleeve as described in Patents 2,139,431-Kreidel and 1,905,665-Weatherhead.

The nut so formed comprises a shell 11, and an inner-sleeve 12. The shell 11 is substantially cylindrical in form except at one end where it is expanded out of cylindrical form to form a head 13, preferably in the shape of a standard nut head such as hexagonal. The cylindrical portion of the shell 11 is exteriorly threaded to form the screw thread 14.

The inner-sleeve 12 comprises tubing having such an outer diameter as to make a relatively tight fit within the threaded cylindrical portion 14 of the shell 11. The ends of the inner sleeve 12 are expanded in order to retain it within the shell 11, preferably a circular flange 15 is formed at the end corresponding to the head 13 and the flange 15 is substantially the diameter of the circle inscribed in the hexagon of the head 13. The opposite end 16 of the inner sleeve 12 is expanded or flared to bear against the end 17 of the shell 11 away from the head 13.

Preferably the shell 11 and the inner sleeve 12 comprise stampings. The shell 11 may be formed of a suitable material such as drawn copper or brass which may readily be formed and which is easily threaded and the inner sleeve 12 may be formed of a material such as stainless steel, for example, which is sufficiently hard and tough so as not to be deformed by the back end of a hard cutting sleeve such as may be employed in a tube coupling in order that the desired force may be applied to such a cutting sleeve by the tube nut.

In forming the tube nut preferably the shell is stamped from tubular material, cut to the desired length, and placed in a die with the desired hexagonal expanded form at one end with a mandrel driven into the tube to form the head. The inner sleeve 12 is also preferably formed from tubing by spinning or rolling the flange 15 at one end. Thereafter the flanged length of tubing is inserted in the shell 11 and the flared end 16 is expanded or spun outwardly to hold the inner sleeve 12 within the shell 11.

Although for some purposes the fit between the sleeve 12 and the shell 11 may be tight enough to prevent turning of one within the other and thus produce a unitary nut, the invention is not limited thereto. It is preferable to maintain the dimension tolerances such that the shell 11 is free to turn as the nut is tightened without causing the inner sleeve 12 to turn, when the tube nut is utilized for coupling flared end tubing such as shown in Patent No. 1,905,665, for example. The flare of the tubing may then be clamped between two non-rotating parts, viz., the body to which the tubing is coupled and the inner sleeve 12 of my tube nut. In this manner radial scuffing on the flare is eliminated which would take place if a one-piece tube nut were employed. Relative rotatability of the shell 11 and the inner-sleeve 12 also allows for alignment of the inner sleeve 11 on the tube flare irrespective of the threads on the shell 11 and thus insures even holding pressure on the tubing being coupled. The conical flare 16 of the sleeve 12 fits a similar flare on tubing to be connected as illustrated in said Patent 1,905,665. This assembly is illustrated in Fig. 4 wherein the flared end 21 of the length of tubing P is clamped between the conical nose 20 of an inverted female fitting F by means of a threaded portion 22 of the fitting, cooperating with the tube nut threads 14.

While I have described my invention as embodied in concrete form and as operating in a specific manner in accordance with the provisions of the patent statutes, it should be understood that I do not limit my invention thereto, since various modifications will suggest themselves to those skilled in the art without departing from the spirit of my invention, the scope of which is set forth in the annexed claim.

What is claimed is:

A tube nut comprising in combination a shell of substantially uniform wall thickness having an hexagonal head at one end with the remainder thereof of reduced diameter, said remainder being substantially cylindrical and exteriorly threaded, an inner sleeve within the shell terminating at one end in a radical flange abutting the said hexagonal shell head, the opposite end of said sleeve being flared against the other end of the shell for retaining said sleeve within said shell, the inner surface of said flared end being formed to engage the flared end of a fluid conducting tube extending through the sleeve.

ALBERT J. WEATHERHEAD, Jr.

REFERENCES CITED

The following references are of record in the file of this patent:

UNITED STATES PATENTS

| Number | Name | Date |
|---|---|---|
| 590,532 | Stevens | Sept. 21, 1897 |
| 879,550 | Huffmaster | Feb. 18, 1908 |
| 1,326,626 | Wolfe | Dec. 30, 1919 |
| 1,867,526 | Anderson | July 12, 1932 |
| 1,905,665 | Weatherhead | Apr. 25, 1933 |
| 2,089,784 | Cornell | Aug. 10, 1937 |